US012436489B2

(12) United States Patent
Kyotani

(10) Patent No.: US 12,436,489 B2
(45) Date of Patent: Oct. 7, 2025

(54) IMAGE FORMING APPARATUS INCLUDING CONTROLLER CAPABLE OF DETERMINING WHETHER DEVELOPING CARTRIDGE, DRUM CARTRIDGE AND BELT UNIT ARE REACHED THEIR LIFETIMES

(71) Applicant: BROTHER KOGYO KABUSHIKI KAISHA, Nagoya (JP)

(72) Inventor: Tadao Kyotani, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 18/489,100

(22) Filed: Oct. 18, 2023

(65) Prior Publication Data

US 2024/0045362 A1 Feb. 8, 2024

Related U.S. Application Data

(63) Continuation of application No. 17/486,348, filed on Sep. 27, 2021, now Pat. No. 11,835,904, which is a (Continued)

(30) Foreign Application Priority Data

Mar. 28, 2019 (JP) ................................ 2019-063075

(51) Int. Cl.
*G03G 15/08* (2006.01)
*G03G 15/00* (2006.01)
*G03G 21/18* (2006.01)

(52) U.S. Cl.
CPC ....... *G03G 15/553* (2013.01); *G03G 15/0863* (2013.01); *G03G 15/556* (2013.01);
(Continued)

(58) Field of Classification Search
CPC ............. G03G 15/0863; G03G 15/553; G03G 15/556; G03G 21/02; G03G 21/1875;
(Continued)

(56) References Cited

U.S. PATENT DOCUMENTS 5,572,292 A * 11/1996 Chatani .............. G03G 21/1889 399/25
6,363,226 B1 * 3/2002 Batori ................ G03G 21/1889 399/12
(Continued)

FOREIGN PATENT DOCUMENTS

EP 2 431 812 A2 3/2012
EP 2 592 497 A2 5/2013
(Continued)

OTHER PUBLICATIONS

Canadian Office Action issued in corresponding Canadian Application No. 3,135,103, Nov. 28, 2023.
(Continued)

*Primary Examiner* — Robert B Beatty
(74) *Attorney, Agent, or Firm* — Merchant & Gould P.C.

(57) ABSTRACT

An image forming apparatus includes a developing cartridge, a main memory and a controller. The controller is configured to perform determining whether the developing cartridge is reached a lifetime on a basis of: at least one of s developing maximum printable number of sheets which corresponds to developing identification information, a maximum developing roller rotation number which corresponds to the developing identification information, and a maximum dot count which corresponds to the developing identification information; and at least one of a developing cumulative number of printed sheets, a cumulative developing roller rotation number and a cumulative dot count.

12 Claims, 9 Drawing Sheets

Related U.S. Application Data continuation of application No. PCT/JP2019/042791, filed on Oct. 31, 2019.

(52) U.S. Cl.
CPC ..... *G03G 21/1875* (2013.01); *G03G 21/1889* (2013.01); *G03G 2215/0697* (2013.01); *G03G 2221/1823* (2013.01)

(58) Field of Classification Search
CPC .......... G03G 21/1878; G03G 21/1889; G03G 2215/0695; G03G 2215/0697; G03G 2221/1663; G03G 2221/1823
USPC ........................... 399/12, 25, 26, 27, 43, 79
See application file for complete search history.

(56) References Cited

U.S. PATENT DOCUMENTS

| | | | | |
|---|---|---|---|---|
| 6,363,228 | B1 | 3/2002 | Ream | |
| 6,871,026 | B2 * | 3/2005 | Shimura | G03G 15/556 399/49 |
| 2004/0105689 | A1 | 6/2004 | Shimura et al. | |
| 2005/0254840 | A1 | 11/2005 | Saisu et al. | |
| 2006/0051106 | A1 | 3/2006 | Takahashi et al. | |
| 2006/0062583 | A1 | 3/2006 | Kikuchi | |
| 2009/0269086 | A1 | 10/2009 | Mikuni | |
| 2009/0317099 | A1 | 12/2009 | Masumoto et al. | |
| 2011/0293295 | A1 | 12/2011 | Shinohara | |
| 2012/0063792 | A1 | 3/2012 | Kim | |
| 2013/0045017 | A1 | 2/2013 | Hayakawa et al. | |
| 2013/0135681 | A1 | 5/2013 | Hayakawa et al. | |
| 2013/0181390 | A1 | 7/2013 | Matsunaga | |
| 2014/0376931 | A1 | 12/2014 | Thacker et al. | |
| 2017/0261884 | A1 | 9/2017 | Kyotani et al. | |
| 2018/0039198 | A1 | 2/2018 | Saito et al. | |
| 2018/0307175 | A1 * | 10/2018 | Ohshika | G03G 15/5016 |
| 2018/0326753 | A1 | 11/2018 | Isaak et al. | |
| 2018/0348666 | A1 | 12/2018 | Suzuki et al. | |
| 2019/0079425 | A1 | 3/2019 | Lin | |

FOREIGN PATENT DOCUMENTS

| | | | |
|---|---|---|---|
| EP | 3 734 371 | A1 | 11/2020 |
| JP | 2000-75740 | A | 3/2000 |
| JP | 2001-109337 | A | 4/2001 |
| JP | 2001-109340 | A | 4/2001 |
| JP | 2002-182532 | A | 6/2002 |
| JP | 2003-048359 | A | 2/2003 |
| JP | 2004-177928 | A | 6/2004 |
| JP | 2005-324487 | A | 11/2005 |
| JP | 2005-326742 | A | 11/2005 |
| JP | 2006-178585 | A | 7/2006 |
| JP | 2008-281802 | A | 11/2008 |
| JP | 2009-3080 | A | 1/2009 |
| JP | 2009-265401 | A | 11/2009 |
| JP | 2011-069952 | A | 4/2011 |
| JP | 2011-221181 | A | 11/2011 |
| JP | 2011-232498 | A | 11/2011 |
| JP | 2015-143760 | A | 8/2015 |
| JP | 2018-55016 | A | 4/2018 |
| JP | 2019-500236 | A | 1/2019 |

OTHER PUBLICATIONS

International Search Report and Written Opinion issued in related international application PCT/JP2019/042791, mailed Jan. 1, 2020.
International Preliminary Report on Patentability issued in corresponding International Patent Application No. PCT/JP2019/042791, Sep. 28, 2021.
Notice of Reasons for Refusal issued in corresponding Japanese Patent Application 2019-063075, Oct. 14, 2022.
Extended European Search Report issued in Application No. 19922158.1, Nov. 16, 2022.
Office Action issued in corresponding Canadian patent application 3,135,103 , Nov. 30, 2022.
Office Action (Notice of Reasons for Refusal) issued in corresponding Japanese Patent Application No. 2019-063075, May 9, 2023.
Office Action issued in corresponding Japanese Patent Application No. 2023-176674, May 21, 2024.
Japanese Office Action issued in corresponding Japanese application No. 2023-176674, Dec. 17, 2024.
Office Action issued in corresponding European Patent Application No. 19 922 158.1, Nov. 27, 2024.

* cited by examiner

FIG. 3

| DEVELOPING IDENTIFICATION INFORMATION | MANUFACTURER | VOLUME | RANK | MAXIMUM DEVELOPING ROLLER ROTATION NUMBER | MAXIMUM DOT COUNT | DEVELOPING MAXIMUM PRINTABLE NUMBER OF SHEETS |
|---|---|---|---|---|---|---|
| 001 | COMPANY X | STD | A | 160000 rotations | 10000000 dots | 4000 sheets |
| 002 | | | B | 155000 rotations | | |
| 003 | | | C | 150000 rotations | | |
| 004 | | HY | A | 160000 rotations | 20000000 dots | 8000 sheets |
| 005 | | | B | 155000 rotations | | |
| 006 | | | C | 150000 rotations | | |
| 007 | | SHY | A | 160000 rotations | 30000000 dots | 12000 sheets |
| 008 | | | B | 155000 rotations | | |
| 009 | | | C | 150000 rotations | | |
| 010 | COMPANY Y | STD | A | 140000 rotations | 10000000 dots | 4000 sheets |
| 011 | | | B | 135000 rotations | | |
| 012 | | HY | A | 140000 rotations | 20000000 dots | 8000 sheets |
| 013 | | | B | 135000 rotations | | |
| 014 | | SHY | A | 140000 rotations | 30000000 dots | 12000 sheets |
| 015 | | | B | 135000 rotations | | |

FIG. 4

| DRUM IDENTIFICATION INFORMATION | MANUFACTURER | MODEL | RANK | MAXIMUM DRUM ROLLER ROTATION NUMBER | DRUM MAXIMUM PRINTABLE NUMBER OF SHEETS |
|---|---|---|---|---|---|
| 001 | COMPANY X | BASE | A | 200000 rotations | 50000 sheets |
| 002 | | | B | 190000 rotations | 49000 sheets |
| 003 | | | C | 185000 rotations | 48000 sheets |
| 004 | | HY | A | 210000 rotations | 53000 sheets |
| 005 | | | B | 200000 rotations | 52000 sheets |
| 006 | | | C | 195000 rotations | 51000 sheets |
| 007 | | FLAGSHIP | A | 220000 rotations | 55000 sheets |
| 008 | | | B | 210000 rotations | 54000 sheets |
| 009 | | | C | 205000 rotations | 53000 sheets |
| 010 | COMPANY Y | BASE | A | 190000 rotations | 48000 sheets |
| 011 | | | B | 180000 rotations | 47000 sheets |
| 012 | | HY | A | 200000 rotations | 51000 sheets |
| 013 | | | B | 190000 rotations | 50000 sheets |
| 014 | | FLAGSHIP | A | 210000 rotations | 53000 sheets |
| 015 | | | B | 200000 rotations | 52000 sheets |

FIG. 5

| BELT IDENTIFICATION INFORMATION | MANUFACTURER | MODEL | RANK | MAXIMUM BELT ROLLER ROTATION NUMBER | BELT MAXIMUM PRINTABLE NUMBER OF SHEETS |
|---|---|---|---|---|---|
| 001 | COMPANY X | BASE | A | 300000 rotations | 60000 sheets |
| 002 | | | B | 295000 rotations | 59000 sheets |
| 003 | | | C | 290000 rotations | 58000 sheets |
| 004 | | HY | A | 305000 rotations | 60500 sheets |
| 005 | | | B | 300000 rotations | 59500 sheets |
| 006 | | | C | 295000 rotations | 58500 sheets |
| 007 | | FLAGSHIP | A | 310000 rotations | 61000 sheets |
| 008 | | | B | 305000 rotations | 60000 sheets |
| 009 | | | C | 300000 rotations | 59000 sheets |
| 010 | COMPANY Y | BASE | A | 305000 rotations | 60500 sheets |
| 011 | | | B | 300000 rotations | 59500 sheets |
| 012 | | HY | A | 310000 rotations | 61000 sheets |
| 013 | | | B | 305000 rotations | 60000 sheets |
| 014 | | FLAGSHIP | A | 315000 rotations | 61500 sheets |
| 015 | | | B | 310000 rotations | 60500 sheets |

IMAGE FORMING APPARATUS INCLUDING CONTROLLER CAPABLE OF DETERMINING WHETHER DEVELOPING CARTRIDGE, DRUM CARTRIDGE AND BELT UNIT ARE REACHED THEIR LIFETIMES

REFERENCE TO RELATED APPLICATIONS

This application is a continuation of U.S. patent application Ser. No. 17/486,348 filed Sep. 27, 2021, now U.S. Pat. No. 11,835,904, which is a by-pass continuation application of International Application No. PCT/JP2019/042791 filed Oct. 31, 2019 claiming priority from Japanese Patent Application No. 2019-063075 filed Mar. 28, 2019. The entire contents of the above-mentioned applications are incorporated herein by reference.

BACKGROUND ART

Technical Field

The present disclosure relates to a developing cartridge and an image forming apparatus to which the developing cartridge is attachable.

Background

There has been known an image forming apparatus to which a developing cartridge is attachable.

DESCRIPTION

Summary

Consumable items, such as developing cartridges, drum cartridges, and belt units, to be attached to an image forming apparatus each have several types (manufacturer, volume, etc.). However, conventional image forming apparatuses is not capable of determining different lifetimes of the consumable item for different type thereof. Thus, proper lifetime management cannot be performed for the consumable item having a plurality of types.

In view of foregoing, it is an object of the present disclosure is to perform proper lifetime management for a consumable item having a plurality of types.

In order to attain the above and other objects, according to one aspect, the disclosure provides a developing cartridge including a developing roller and a developing memory. The developing memory has a first developing storage area and a second developing storage area. The first developing storage area stores therein developing identification information which identifies a specific type of the developing cartridge from among a plurality of types of the developing cartridge. The second developing storage area is different from the first developing storage area. The second developing storage area stores therein at least one of a developing cumulative number of printed sheets printed by using the developing cartridge, a cumulative developing roller rotation number when the printing is performed by using the developing cartridge, and a cumulative dot count printed by using the developing cartridge. Whether the developing cartridge is reached a lifetime is determinable on a basis of: at least one of a developing maximum printable number of sheets which corresponds to the developing identification information, a maximum developing roller rotation number which corresponds to the developing identification information, and a maximum dot count which corresponds to the developing identification information; and at least one of the developing cumulative number of printed sheets stored in the second developing storage area, the cumulative developing roller rotation number stored in the second developing storage area and the cumulative dot count stored in the second developing storage area. The developing maximum printable number of sheets indicates an upper limit number of printable sheets. The maximum developing rotation number indicates an upper limit number of rotations of the developing roller. The maximum dot count indicates an upper limit number of printable dots.

According to another aspect, the disclosure provides an image forming apparatus including a main body, a developing cartridge, a main memory and a controller. The developing cartridge is attachable to the main body. The developing cartridge includes a developing roller and a developing memory. The developing memory has a first developing storage area and a second developing storage area. The first developing storage area stores therein developing identification information which identifies a specific type of the developing cartridge from among a plurality of types of the developing cartridge. The second developing storage area is different from the first developing storage area. The main memory stores therein: a plurality of pieces of the developing identification information; and at least one of a developing maximum printable number of sheets indicating an upper limit number of printable sheets in correspondence with each of the plurality of pieces of developing identification information, a maximum developing rotation number indicating an upper limit number of rotations of the developing roller in correspondence with each of the plurality of pieces of developing identification information, and a maximum dot count indicating an upper limit number of printable dots in correspondence with each of the plurality of pieces of developing identification information. The controller configured to perform: storing, in the second developing storage area, at least one of a developing cumulative number of printed sheets printed by using the developing cartridge, a cumulative developing roller rotation number when the printing is performed by using the developing cartridge, and a cumulative dot count printed by using the developing cartridge. The controller is configured to further perform reading the developing identification information stored in the first developing storage area. The controller is configured to further perform determining whether the developing cartridge is reached a lifetime on a basis of: at least one of the developing maximum printable number of sheets which corresponds to the read developing identification information, the maximum developing roller rotation number which corresponds to the read developing identification information, and the maximum dot count which corresponds to the read developing identification information; and at least one of the developing cumulative number of printed sheets stored in the second developing storage area, the cumulative developing roller rotation number stored in the second developing storage area and the cumulative dot count stored in the second developing storage area.

According to another aspect, the disclosure provides a drum cartridge includes a photosensitive drum and a drum memory. The drum memory has a first drum storage area and a second drum storage area. The first drum storage area stores therein drum identification information which identifying a specific type of the drum cartridge from among a plurality of types of the drum cartridge. The second drum storage area is different from the first drum storage area. The second drum storage area stores therein at least one of a drum cumulative number of printed sheets printed by using the drum cartridge, and a cumulative drum rotation number when the printing is performed by using the drum cartridge. Whether the drum cartridge is reached a lifetime is determinable on a basis of: at least one of a drum maximum printable number of sheets which corresponds to the drum identification information, and a maximum drum rotation number which corresponds to the drum identification information; and at least one of the drum cumulative number of printed sheets stored in the second drum storage area and the cumulative drum rotation number stored in the second drum storage area. The drum maximum printable number of sheets indicates an upper limit number of printable sheets. The maximum drum rotation number indicates an upper limit number of rotations of the photosensitive drum.

According to another aspect, the disclosure provides a belt unit includes a belt and a belt memory. The belt memory has a first belt storage area and a second belt storage area. The first belt storage area stores therein belt identification information which identifying a specific type of the belt unit from among a plurality of types of the belt unit. The second belt storage area is different from the first belt storage area. The second belt storage area stores therein at least one of a belt cumulative number of printed sheets printed by using the belt unit, and a cumulative belt rotation number when the printing is performed by using the belt unit. Whether the belt unit is reached the lifetime is determinable on a basis of: at least one of a belt maximum printable number of sheets which corresponds to the belt identification information, and a maximum belt rotation number which corresponds to the belt identification information; and at least one of the belt cumulative number of printed sheets stored in the second drum storage area and the cumulative belt rotation number stored in the second belt storage area. The belt maximum printable number of sheets indicates an upper limit number of printable sheets. The maximum belt rotation number indicates an upper limit number of rotations of the belt.

BRIEF DESCRIPTION OF THE DRAWINGS

The particular features and advantages of the disclosure will become apparent from the following description taken in connection with the accompanying drawings, in which:

FIG. 3 is a table indicating lifetime information of a developing cartridge corresponding to a plurality of pieces of developing identification information;

FIG. 4 is a table indicating lifetime information of the drum cartridge corresponding to a plurality of pieces of drum identification information;

FIG. 5 is a table indicating lifetime information of the belt unit corresponding to a plurality of pieces of belt identification information;

DETAILED DESCRIPTION

Figure 1:
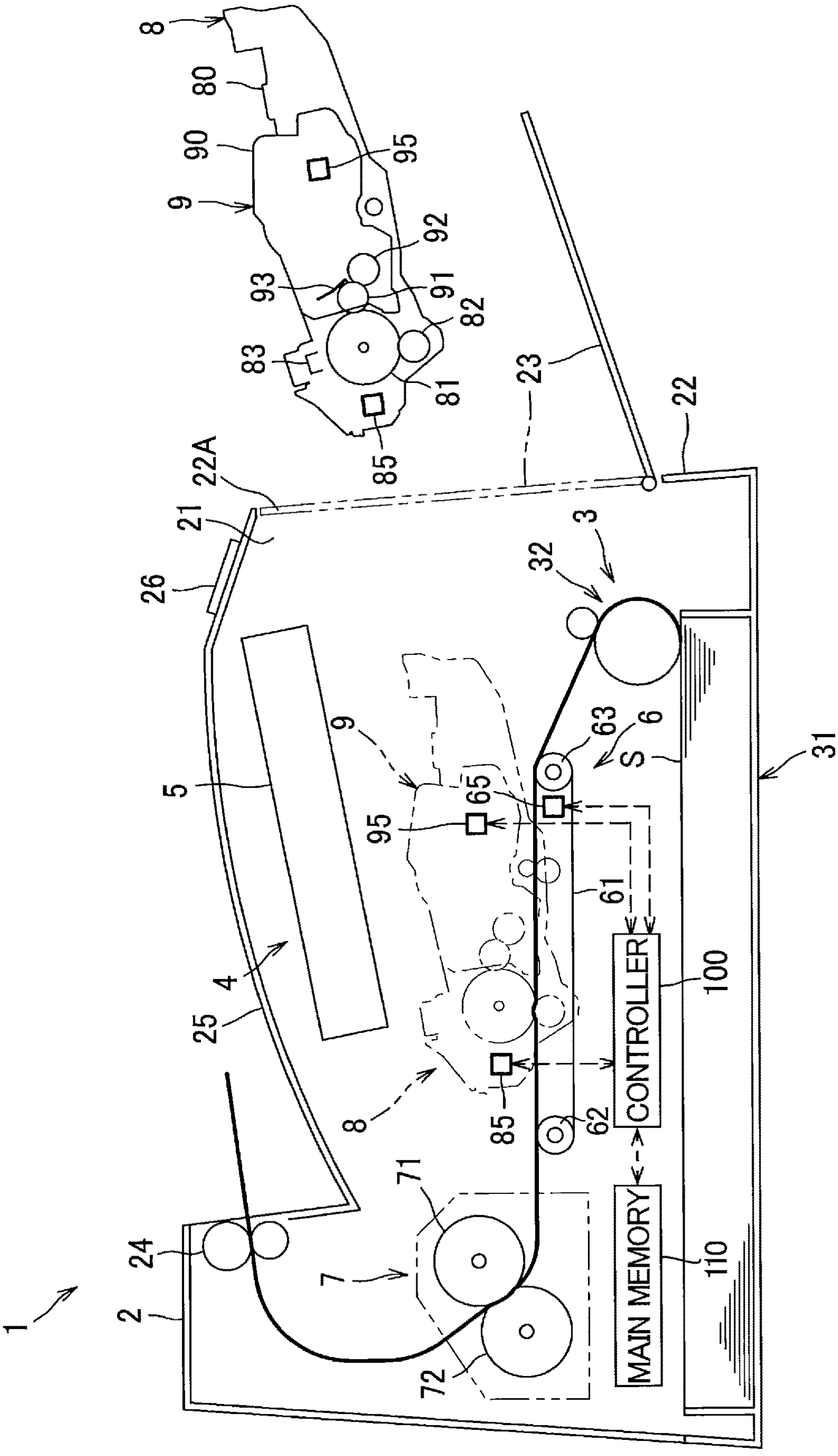
FIG. 1 is a schematic cross-sectional view of an image forming apparatus according to one embodiment.

An embodiment of the present disclosure will be described in detail with reference to the drawings. As illustrated in FIG. 1, an image forming apparatus 1 is a monochromatic laser printer. The image forming apparatus 1 includes a main body 2, a feeder part 3, an image forming part 4, a controller 100, a main memory 110, and a display 26.

The main body 2 is a hollow case. The main body 2 has a pair of left and right side walls 21 and a front wall 22 connecting the side walls 21. The front wall 22 has a main body opening 22A. The front wall 22 is provided with a front cover 23 for closing and opening the main body opening 22A.

The feeder part 3 has a feed tray 31 and a feed mechanism 32. The feed tray 31 is detachably attached to a lower portion of the main body 2. The feed mechanism 32 feeds a sheet S in the feed tray 31 toward the image forming part 4.

The image forming part 4 includes a scanner unit 5, a belt unit 6, a fixing unit 7, a drum cartridge 8, and a developing cartridge 9.

The scanner unit 5 is positioned at an upper portion inside the main body 2 and has not-shown components such as a laser emitting part, a polygon mirror, a lens, and a reflecting mirror. In the scanner unit 5, laser beam is irradiated onto the surface of a photosensitive drum 81 to be described later by high-speed scanning.

The belt unit 6 includes a belt 61, a drive roller 62, a driven roller 63, and a belt memory 65. The belt unit 6 is detachably attached to the main body 2 (see FIG. 2). The belt unit 6 is an example of a consumable item.

The belt 61 is an endless belt. The drive roller 62 drives the belt 61. The driven roller 63 rotates following the belt 61.

The belt memory 65 is a medium that stores information. For example, the belt memory 65 is, but not limited to, an IC chip. The belt memory 65 has a first belt storage area and a second belt storage area which is a storage area different from the first belt storage area.

The controller 100 includes, for example, a CPU, a RAM, a ROM, and an input/output circuit. The controller 100 is configured to perform arithmetic processing on a basis of information related to an attached cartridge and a program or data stored in the ROM for controlling printing operation.

The display 26 is positioned on an outer surface of the main body 2. The display 26 displays various messages based on instructions from the controller 100.

The drum cartridge 8 is positioned between the feeder part 3 and the scanner unit 5. The drum cartridge 8 is detachably attached to the main body 2. Specifically, the drum cartridge 8 is detachably attached to the main body 2 through the main body opening 22A opened and closed by the front cover 23 of the main body 2. The drum cartridge 8 is an example of a consumable item.

Figure 2:
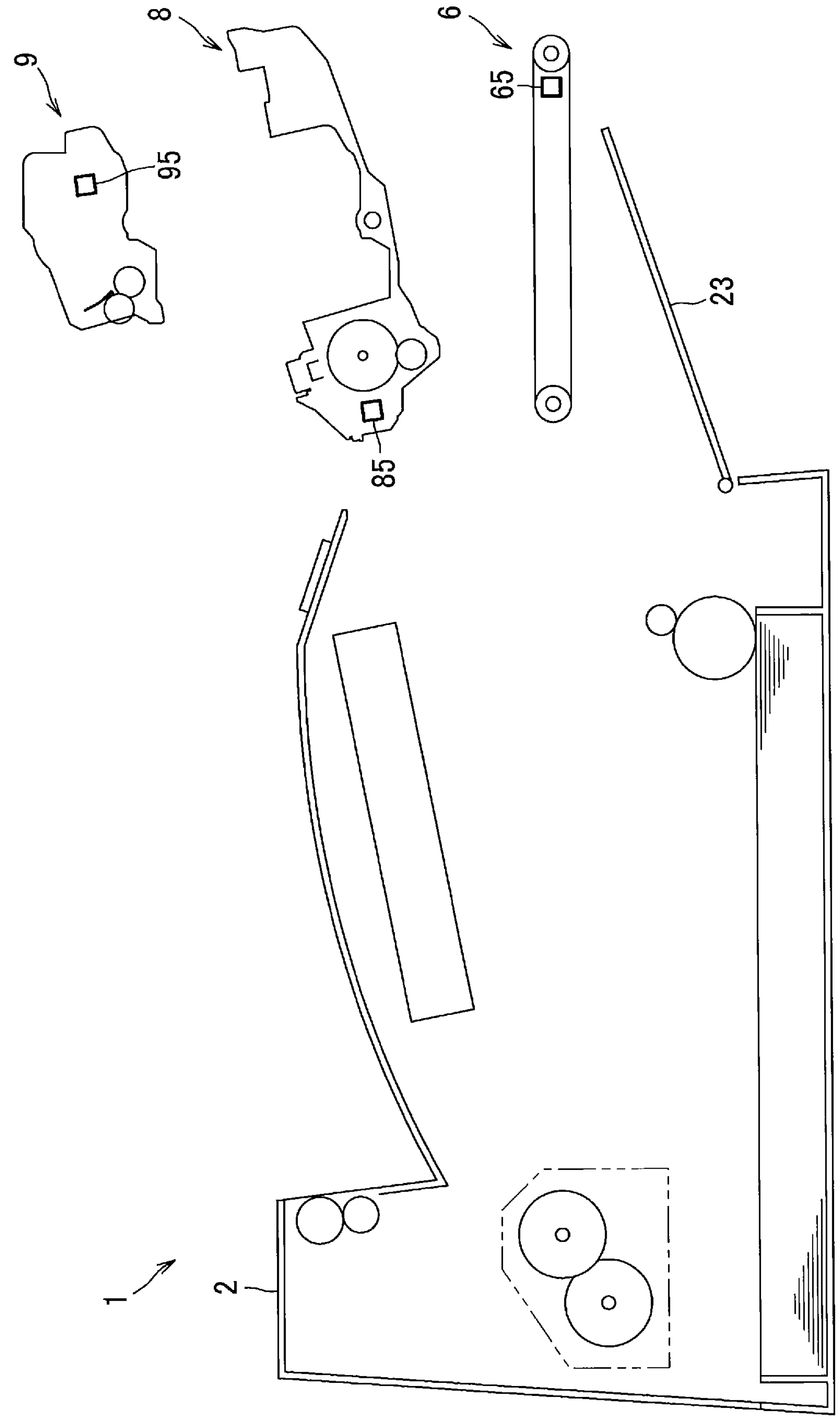
FIG. 2 is a schematic cross-sectional view of the image forming apparatus according to the embodiment, in a state where a drum cartridge and a belt unit are removed from a main body of the image forming apparatus.

As illustrated in FIG. 2, the developing cartridge 9 is configured to be attachable to the main body 2. In the present embodiment, the developing cartridge 9 is detachably attached to the drum cartridge 8. The developing cartridge 9 is attached to the main body 2 in a state of being attached to the drum cartridge 8. The developing cartridge 9 is an example of a consumable item.

Referring back to FIG. 1, the drum cartridge 8 has a frame 80, a photosensitive drum 81, a transfer roller 82, a charger 83, and a drum memory 85. The developing cartridge 9 is configured to be attachable to the frame 90. The photosensitive drum 81 and transfer roller 82 are rotatably supported to the frame 80.

The drum memory 85 is a medium that stores information. For example, the drum memory 85 is, but not limited to, an IC chip. The drum memory 85 has a first drum storage area and a second drum storage area which is a storage area different from the first drum storage area.

The developing cartridge 9 has a housing 90, a developing roller 91, a supply roller 92, a blade 93, and a developing memory 95. The housing 90 is configured to accommodate toner therein. The developing roller 91 supplies the photosensitive drum 81 with the toner. The supply roller 92 supplies the developing roller 92 with the toner in the housing 90. The blade 93 regulates the layer thickness of the toner on the developing roller 91.

The developing memory 95 is a medium that stores information. For example, the developing memory 95 is, but not limited to, an IC chip. The developing memory 95 has a first developing storage area and a second developing storage area which is a storage area different from the first developing storage area.

In the drum cartridge 8, the surface of the rotating photosensitive drum 81 is uniformly charged by the charger 83 and is then exposed by high-speed scanning of laser beam emitted from the scanner unit 5. As a result, the potential of the exposed part is lowered to form an electrostatic latent image based on image data on the surface of the photosensitive drum 81.

Then, the toner in the developing cartridge 9 is supplied to the electrostatic latent image on the photosensitive drum 81 by the developing roller 91 driven into rotation to form a toner image on the surface of the photosensitive drum 81. Thereafter, a sheet S is conveyed between the photosensitive drum 81 and the transfer roller 82, whereby the toner image retained on the surface of the photosensitive drum 81 is transferred onto the sheet S.

The fixing unit 7 has a heating roller 71 and a pressure roller 72. The pressure roller 72 faces the heating roller 71. The pressure roller 72 presses the heating roller 71. The fixing unit 7 heat-fixes the toner transferred onto the sheet S during a time when the sheet S is passing between the heating roller 71 and the pressure roller 72.

The sheet S onto which the toner image has been heat-fixed by the fixing unit 7 is conveyed to a discharge roller 24 provided downstream from the fixing unit 7 and fed onto a discharge tray 25 by the discharge roller 24.

The main memory 110 stores lifetime information of the developing cartridges 9 corresponding to a plurality of pieces of developing identification information illustrated in FIG. 3. As illustrated in FIG. 3, developing maximum printable number of sheets, maximum developing roller rotation number, and maximum dot count are associated with each of the plurality of pieces of developing identification information. The developing identification information is information for identifying the type of the developing cartridge 9.

In the present embodiment, a unique piece of identification information is assigned as the developing identification information based on a combination of manufacturer, volume, and rank. For example, the manufacturer is classified into two types: company X and company Y. The volume is classified into three types: standard (STD), large (HY), and extra large (SHY). The product of company X has ranks of A, B, and C. The product of company Y has ranks of A and B. As described above, in the present embodiment, identifiers 001 to 015 corresponding to a combination of a plurality of types are assigned respectively to the developing cartridges 9 as the plurality of pieces of developing identification information.

The main memory 110 stores the developing maximum printable number of sheets, maximum developing roller rotation number, and maximum dot count for each piece of developing identification information. For example, maximum developing roller rotation number of 160000, maximum dot count of 10000000, and developing maximum printable number of sheets of 4000 are stored corresponding to the developing identification information of 001. The maximum developing roller rotation number indicates an upper limit of the number of rotations of the developing roller 91. The maximum dot count indicates an upper limit of the number of printable dots. The developing maximum printable number of sheets indicates an upper limit of the number of printable sheets.

The developing memory 95 stores, in the first developing storage area, the developing identification information for identifying a specific type of the developing cartridge 9 from among a plurality of types of the developing cartridge 9. Specifically, of the plurality of pieces of developing identification information 001 to 015, one piece is stored in the first developing storage area of the developing memory 95.

The controller 100 is configured to execute a storage process, a read process, and a determination process for the developing cartridge 9.

In the storage process, the controller 100 stores, in the second developing storage area, at least one of a developing cumulative number of printed sheets printed by using the developing cartridge 9, a cumulative developing roller rotation number when the printing is performed by using the developing cartridge 9, and a cumulative dot count printed by using the developing cartridge 9. Specifically, when printing for a predetermined number of sheets is executed based on an input of a print job to the image forming apparatus 1, the controller 100 stores, in the second developing storage area of the developing memory 95, the developing cumulative number of printed sheets, cumulative developing roller rotation number, and cumulative dot count which are obtained by adding the values of the developing number of printed sheets, developing roller rotation number, and dot count obtained in the printing to the values of those obtained before the printing. This storage process is repeatedly performed for every predetermined number of sheets until the print job is completed.

In the read process, the controller 100 reads the developing identification information stored in the developing memory 95. Further, the controller 100 reads the developing cumulative number of printed sheets, cumulative dot count, and cumulative developing roller rotation number from the second developing storage area of the developing memory 95.

In the determination process, the controller 100 determines whether the developing cartridge 9 is reached its lifetime by using at least one of the developing maximum printable number of sheets, maximum developing roller rotation number, and maximum dot count corresponding to the developing identification information read from among the plurality of pieces of developing identification information stored in the main memory 110 and at least one of the developing cumulative number of printed sheets stored in the second developing storage area of the developing memory 95, cumulative developing roller rotation number stored in the second developing storage area of the developing memory 95, and cumulative dot count stored in the second developing storage area of the developing memory 95.

In the present embodiment, in the determination process, the developing maximum printable number of sheets, maximum developing roller rotation number, and maximum dot count and the developing cumulative number of printed sheets, cumulative developing roller rotation number, and cumulative dot count are used to determine whether the developing cartridge 9 is reached its lifetime. That is, when any one of the developing cumulative number of printed sheets, cumulative developing roller rotation number, and cumulative dot count is reached its upper limit, the developing cartridge 9 is determined to be reached its lifetime.

In the determination process, when determining at least one of the cases where the developing cumulative number of printed sheets exceeds the developing maximum printable number of sheets, where the cumulative developing roller rotation number exceeds the maximum developing roller rotation number, and where the cumulative dot count exceeds the maximum dot count, the controller 100 determines that an error indicating that the developing cartridge 9 is reached its lifetime is occurred.

When determining that the error is occurred in the determination process, the controller 100 displays, on the display 26, information related to the error.

Further, the controller 100 determines that an error is occurred when the read developing identification information is not found among the plurality of pieces of developing identification information (see FIG. 3) stored in the main memory 110. Specifically, when the developing identification information that the controller 100 reads from the first developing storage area of the developing memory 95 is not present in the table of the main memory 110, the controller 100 determines that the error concerning the type of the developing cartridge 9 is occurred and displays an error message on the display 26.

The main memory 110 stores lifetime information of the drum cartridges 8 corresponding to a plurality of pieces of drum identification information illustrated in FIG. 4. As illustrated in FIG. 4, drum maximum printable number of sheets and maximum drum rotation number are associated with each of the plurality of pieces of drum identification information. The drum identification information is information for identifying the type of the drum cartridge 8.

In the present embodiment, a unique piece of identification information is assigned as the drum identification information based on a combination of manufacturer, model, and rank. For example, the manufacturer is classified into two types: company X and company Y. The model is classified into three types: basic (BASE), large (HY), and flagship (Flagship). The product of company X has rank A, rank B, and rank C. The product of company Y has rank A and rank B. As described above, in the present embodiment, identifiers 001 to 015 corresponding to a combination of a plurality of types are assigned respectively to the drum cartridges 8 as the plurality of pieces of drum identification information.

The main memory 110 stores the drum maximum printable number of sheets and maximum drum rotation number for each piece of drum identification information. For example, maximum drum rotation number of 200000 and drum maximum printable number of sheets of 50000 are stored corresponding to the drum identification information of 001. The maximum drum rotation number indicates the upper limit of the number of rotations of the photosensitive drum 81. The drum maximum printable number of sheets indicates the upper limit of the number of printable sheets.

The drum memory 85 stores, in the first drum storage area, the drum identification information for identifying a specific type of the drum cartridge 8 from among a plurality of types of the drum cartridge 8. Specifically, of the plurality of pieces of drum identification information 001 to 015, one piece of drum identification information is stored in the first drum storage area of the drum memory 85.

The controller 100 is configured to execute a storage process, a read process, and a determination process for the drum cartridge 8.

In the storage process, the controller 100 stores, in the second drum storage area, at least one of the drum cumulative number of printed sheets printed by using the drum cartridge 8 and cumulative drum rotation number when the printing is performed by using the drum cartridge 8. Specifically, when printing for a predetermined number of sheets is executed based on an input of a print job to the image forming apparatus 1, the controller 100 stores, in the second drum storage area of the drum memory 85, the drum cumulative number of printed sheets and cumulative drum rotation number which are obtained by adding the values of the drum number of printed sheets and drum rotation number obtained in the printing to the values of those obtained before the printing. This storage process is repeatedly performed for every predetermined number of sheets until the print job is completed.

In the read process, the controller 100 reads the drum identification information stored in the drum memory 85. Specifically, the controller 100 reads the drum cumulative number of printed sheets and cumulative drum rotation number from the second drum storage area of the drum memory 85.

In the determination process, the controller 100 uses at least one of the drum maximum printable number of sheets and maximum drum rotation number corresponding to the drum identification information read from among the plurality of pieces of drum identification information stored in the main memory 110 and at least one of the drum cumulative number of printed sheets stored in the second drum storage area of the drum memory 85 and cumulative drum rotation number stored in the second drum storage area of the drum memory 85 to determine whether the drum cartridge 8 is reached its lifetime.

In the present embodiment, in the determination process, drum maximum printable number of sheets and maximum drum rotation number, and the drum cumulative number of printed sheets and cumulative drum rotation number are used to determine whether the drum cartridge 8 is reached its lifetime. That is, when any one of the drum cumulative number of printed sheets and cumulative drum rotation number is reached its upper limit, the drum cartridge 8 is determined to be reached its lifetime.

In the determination process, when determining at least one of the cases where the drum cumulative number of printed sheets exceeds the drum maximum printable number of sheets and where the cumulative drum rotation number exceeds the maximum drum rotation number, the controller 100 determines that an error indicating that the drum cartridge 8 is reached its lifetime is occurred.

When determining that the error is occurred the error in the determination process, the controller 100 displays an error message on the display 26.

Further, the controller 100 determines that an error is occurred when the read drum identification information is not found among the plurality of pieces of drum identification information (see FIG. 4) stored in the main memory 110. Specifically, when the drum identification information that the controller 100 reads from the first drum storage area of the drum memory 85 is not present in the table of the main memory 110, the controller 100 determines that the error concerning the type of the drum cartridge 8 is occurred and displays an error message on the display 26.

The main memory 110 stores lifetime information of the belt unit 6 corresponding to a plurality of pieces of belt identification information illustrated in FIG. 5. As illustrated in FIG. 5, belt maximum printable number of sheets and maximum belt rotation number are associated with each of the plurality of pieces of belt identification information. The belt identification information is information for identifying the type of the belt unit 6.

In the present embodiment, a unique piece of identification information is assigned as the belt identification information based on a combination of manufacturer, model, and rank. For example, the manufacturer is classified into two types: company X and company Y. The model is classified into three types: basic (BASE), large (HY), and flagship (Flagship). The product of company X has rank A, rank B, and rank C. The product of company Y has rank A and rank B. As described above, in the present embodiment, identifiers 001 to 015 corresponding to a combination of a plurality of types are assigned respectively to the belt unit 6 as the plurality of pieces of belt identification information.

The main memory 110 stores the belt maximum printable number of sheets and maximum belt rotation number for each piece of belt identification information. For example, maximum belt rotation number of 300000 and belt maximum printable number of sheets of 60000 are stored corresponding to the belt identification information of 001. The maximum belt rotation number indicates the upper limit of the number of rotations of the belt 61. The belt maximum printable number of sheets indicates the upper limit of the number of printable sheets.

The belt memory 65 stores, in the first belt storage area, the belt identification information for identifying a specific type of the belt unit 6 from among a plurality of types of the belt unit 6. Specifically, of the plurality of pieces of belt identification information 001 to 015, one piece of belt identification information is stored in the first belt storage area of the belt memory 65.

The controller 100 is configured to execute a storage process, a read process, and a determination process for the belt unit 6.

In the storage process, the controller 100 stores, in the second belt storage area, at least one of the belt cumulative number of printed sheets printed by using the belt unit 6 and cumulative belt rotation number when the printing is performed by using the belt unit 6. Specifically, when printing for a predetermined number of sheets is executed based on an input of a print job to the image forming apparatus 1, the controller 100 stores, in the second belt storage area of the belt memory 65, the belt cumulative number of printed sheets and cumulative belt rotation number which are obtained by adding the values of the belt number of printed sheets and belt rotation number obtained in the printing to the values of those obtained before the printing. This storage process is repeatedly performed for every predetermined number of sheets until the print job is completed.

In the read process, the controller 100 reads the belt identification information stored in the belt memory 65. Specifically, the controller 100 reads the belt cumulative number of printed sheets and cumulative belt rotation number from the second belt storage area of the belt memory 65.

In the determination process, the controller 100 uses at least one of the belt maximum printable number of sheets and maximum belt roller rotation number corresponding to the belt identification information read from among the plurality of pieces of belt identification information stored in the main memory 110 and at least one of the belt cumulative number of printed sheets stored in the second belt storage area of the belt memory 65 and cumulative belt rotation number stored in the second belt storage area of the belt memory 65 to determine whether the belt unit 6 is reached its lifetime.

In the present embodiment, in the determination process, belt maximum printable number of sheets and maximum belt rotation number, and the belt cumulative number of printed sheets and cumulative belt rotation number are used to determine whether the belt unit 6 is reached its lifetime. That is, when any one of the belt cumulative number of printed sheets and cumulative belt rotation number is reached its upper limit, the belt unit 6 is determined to be reached its lifetime.

In the determination process, when determining at least one of the cases where the belt cumulative number of printed sheets exceeds the belt maximum printable number of sheets and where the cumulative belt rotation number exceeds the maximum belt rotation number, the controller 100 determines that an error indicating that the belt unit 6 is reached its lifetime is occurred.

When determining that the error is occurred in the determination process, the controller 100 displays, on the display 26, information on the error.

Further, the controller 100 determines that an error is occurred when the read belt identification information is not found among the plurality of pieces of belt identification information (see FIG. 5) stored in the main memory 110. Specifically, when the belt identification information that the controller 100 reads from the first belt storage area of the belt memory 65 is not present in the table of the main memory 110, the controller 100 determines that the error concerning the type of the belt unit 6 is occurred and displays an error message on the display 26.

Figure 6:
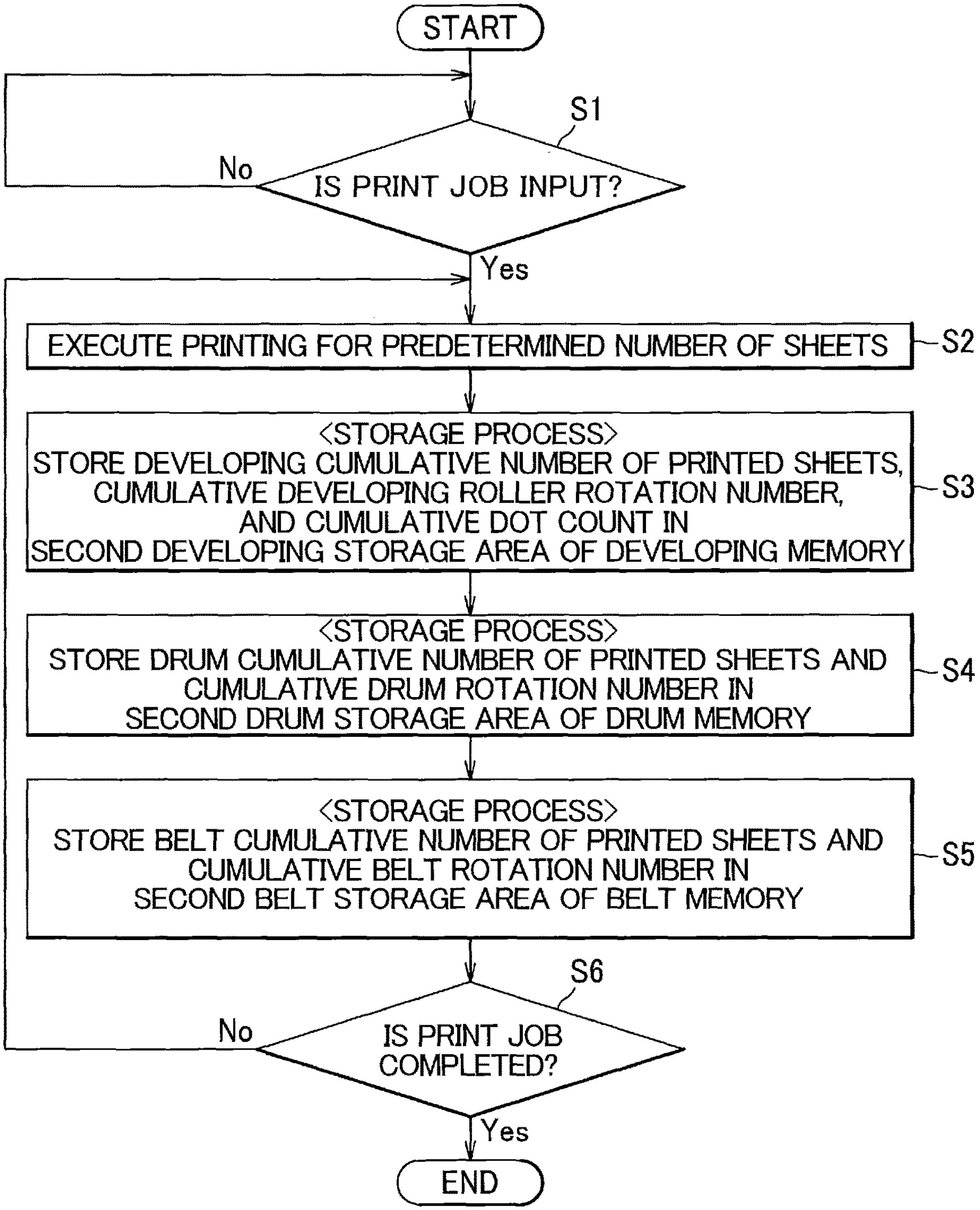
FIG. 6 is a flowchart illustrating a storage process.

The following describes an example of the storage process executed by the controller 100 with reference to a flowchart of FIG. 6.

As illustrated in FIG. 6, when determining an input of a print job to the image forming apparatus 1 (Yes in S1), the controller 100 executes printing for a predetermined number of sheets (S2). The predetermined number of sheets may be one, or two or more. When there is no input of a print job to the image forming apparatus 1 (No in S1), the controller 100 waits for the input of a print job.

After step S2, as the storage process, the controller 100 stores, in the second developing storage area of the developing memory 95 printed by using the developing cartridge 9, the developing cumulative number of printed sheets, cumulative developing roller rotation number when the printing is performed by using the developing cartridge 9, and cumulative dot count printed by using the developing cartridge 9 (S3).

After step S3, as the storage process, the controller 100 stores, in the second drum storage area of the drum memory 85, the drum cumulative number of printed sheets printed by using the drum cartridge 8 and cumulative drum rotation number when the printing is performed by using the drum cartridge 8 (S4).

After step S4, as the storage process, the controller 100 stores, in the second belt storage area of the belt memory 65, the belt cumulative number of printed sheets printing by using the belt unit 6 and cumulative belt rotation number when the printing is performed by using the belt unit 6 (S5).

After step S5, the controller 100 determines whether the print job is completed (S6). When determining that the print job is not completed (No in S6), the controller 100 returns to step S2 and continues executing printing. On the other hand, when determining that the print job is completed (Yes in S6), the controller 100 ends this routine.

Figure 7:
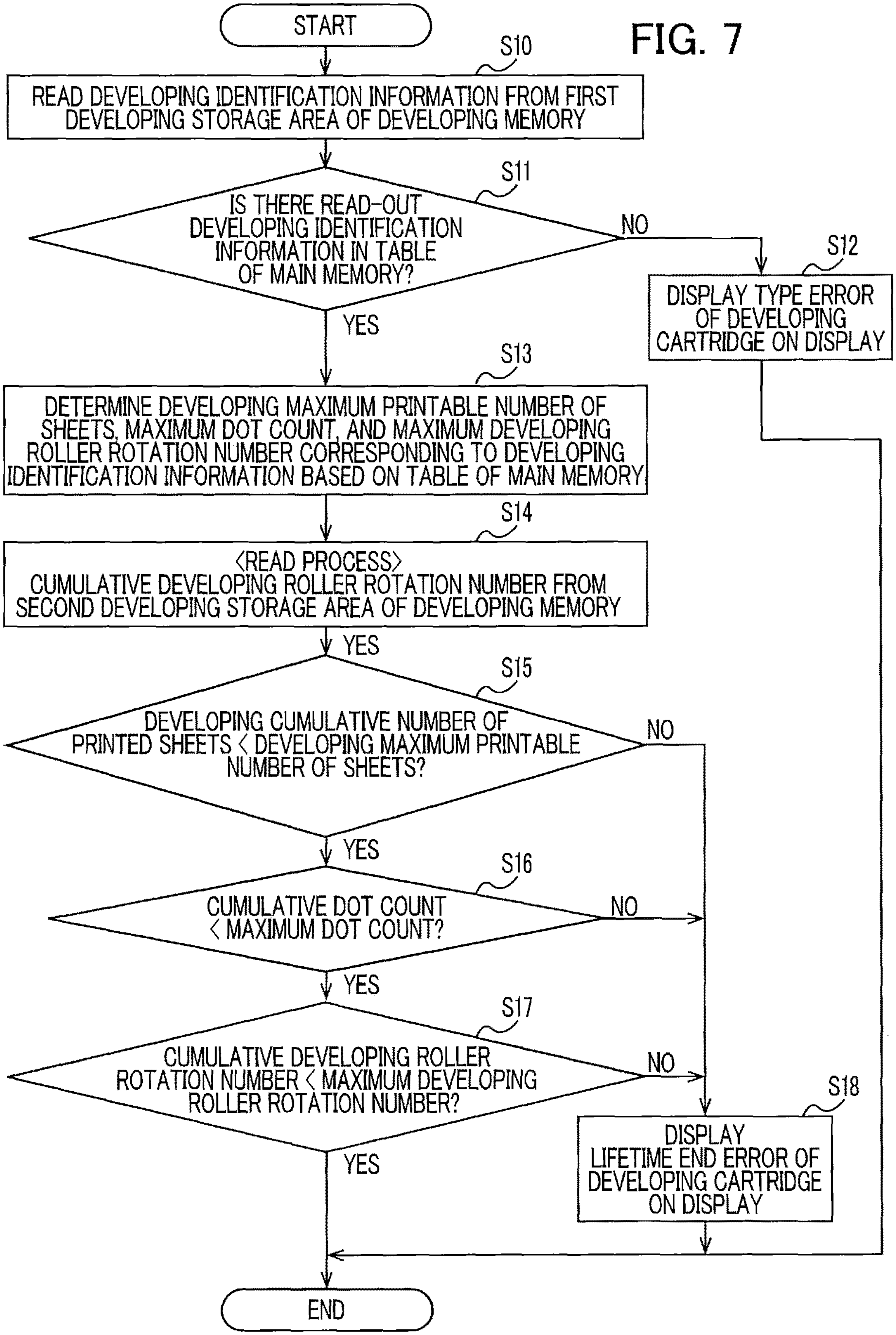
FIG. 7 is a flowchart illustrating a lifetime check process of the developing cartridge.

The following describes an example of lifetime check process for the developing cartridge 9 executed by the controller 100 with reference to a flowchart illustrated in FIG. 7. The lifetime check process is repeatedly performed until the image forming apparatus 1 is turned off after the image forming apparatus 1 is turned on.

As illustrated in FIG. 7, the controller 100 reads the developing identification information from the first developing storage area of the developing memory 95 (S10).

After step S10, the controller 100 determines whether there is the read developing identification information in the table (see FIG. 3) of the main memory 110 (S11).

When determining in step S11 that the read developing identification information is not present in the table of the main memory 110 (No in S11), the controller 100 determines that the developing cartridge 9 does not adapt to the image forming apparatus 1, displays the type error of the developing cartridge 9 on the display 26 (S12), and ends this routine.

On the other hand, when determining in step S11 that the read developing identification information is present in the table of the main memory 110 (Yes in S11), the controller 100 determines the developing maximum printable number of sheets, maximum dot count, and maximum developing roller rotation number corresponding to the developing identification information based on the table of the main memory 110 (S13).

After step S13, as the read process, the controller 100 reads the developing cumulative number of printed sheets, cumulative dot count, and cumulative developing roller rotation number from the second developing storage area of the developing memory 95 (S14).

After step S14, the controller 100 determines whether the developing cumulative number of printed sheets is smaller than the developing maximum printable number of sheets (S15). When determining in step S15 that the developing cumulative number of printed sheets is not smaller than the developing maximum printable number of sheets (No in S15), the controller 100 determines that the developing cartridge 9 is reached its lifetime and displays, on the display 26, a lifetime end error message concerning the developing cartridge 9 (S18).

When determining in step S15 that the developing cumulative number of printed sheets is smaller than the developing maximum printable number of sheets (Yes in S15), the controller 100 determines whether the cumulative dot count is smaller than the maximum dot count (S16). When determining in step S16 that the cumulative dot count is not smaller than the maximum dot count (No in S16), the controller 100 determines that the developing cartridge 9 is reached its lifetime and displays, on the display 26, a lifetime end error message concerning the developing cartridge 9 (S18).

When determining in step S16 that the cumulative dot count is smaller than the maximum dot count (Yes in S16), the controller 100 determines whether the cumulative developing roller rotation number is smaller than the maximum developing roller rotation number (S17). When determining in step S17 that the cumulative developing roller rotation number is not smaller than the maximum developing roller rotation number (No in S17), the controller 100 determines that the developing cartridge 9 is reached its lifetime and displays, on the display 26, a lifetime end error message concerning the developing cartridge 9 (S18).

When determining in step S17 that the cumulative developing roller rotation number is smaller than the maximum developing roller rotation number (Yes in S17), the controller 100 determines that the developing cartridge 9 is not reached its lifetime.

Figure 8:
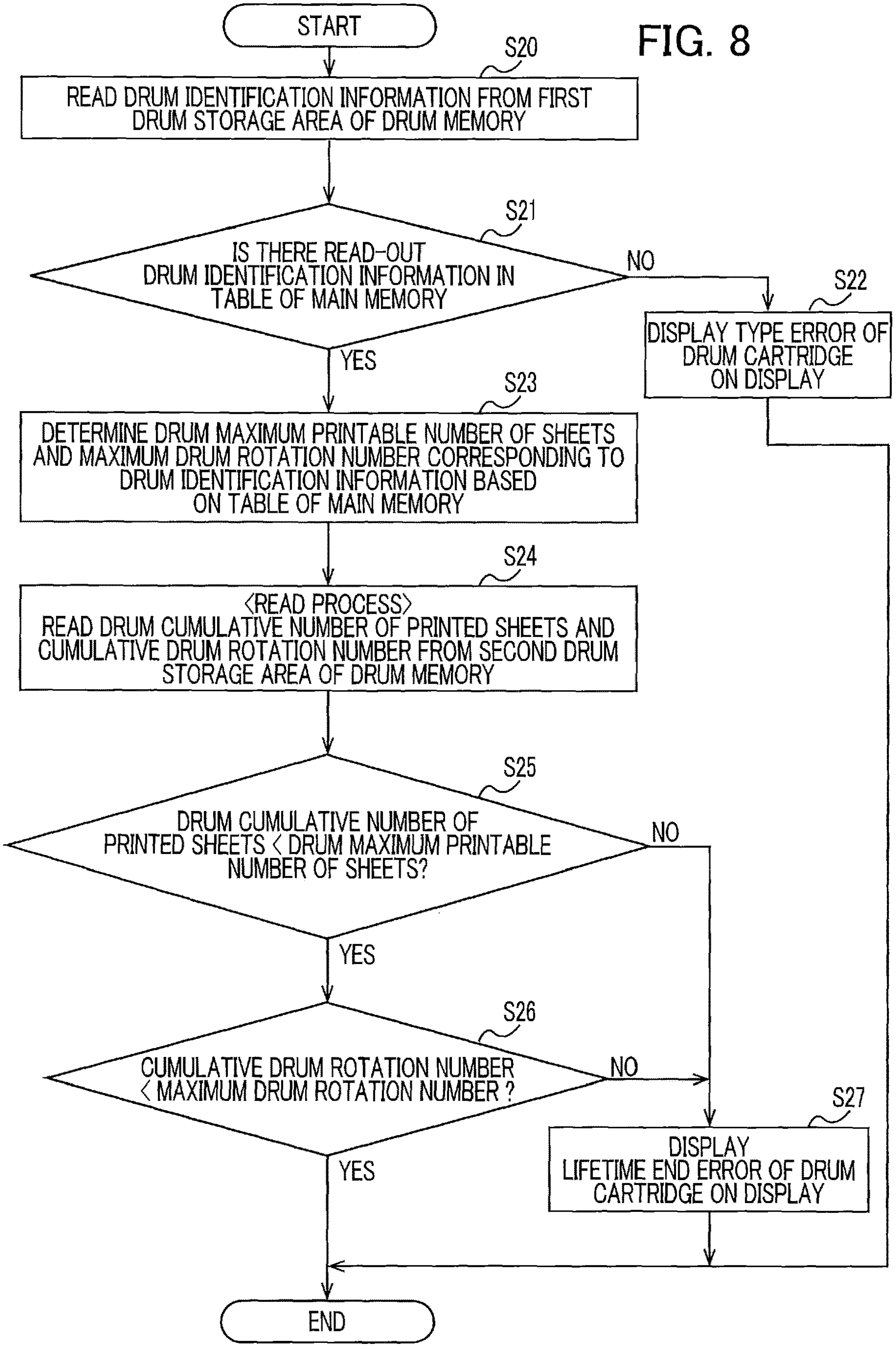
FIG. 8 is a flowchart illustrating a lifetime check process of the drum cartridge.

The following describes an example of lifetime check process for the drum cartridge 8 executed by the controller 100 with reference to a flowchart illustrated in FIG. 8. The lifetime check process is repeatedly performed until the image forming apparatus 1 is turned off after the image forming apparatus 1 is turned on.

As illustrated in FIG. 8, the controller 100 reads the drum identification information from the first drum storage area of the drum memory 85 (S20).

After step S20, the controller 100 determines whether there is the read drum identification information in the table (see FIG. 4) of the main memory 110 (S21).

When determining in step S21 that the read drum identification information is not present in the table of the main memory 110 (No in S21), the controller 100 determines that the drum cartridge 8 does not adapt to the image forming apparatus 1, displays, on the display 26, a type error message concerning the drum cartridge 8 (S22), and ends this routine.

On the other hand, when determining in step S21 that the read drum identification information is present in the table of the main memory 110 (Yes in S21), the controller 100 determines the drum maximum printable number of sheets and maximum drum rotation number corresponding to the drum identification information based on the table of the main memory 110 (S23).

After step S23, as the read process, the controller 100 reads the drum cumulative number of printed sheets and cumulative drum rotation number from the second drum storage area of the drum memory 85 (S24).

After step S24, the controller 100 determines whether the drum cumulative number of printed sheets is smaller than the drum maximum printable number of sheets (S25). When determining in step S25 that the drum cumulative number of printed sheets is not smaller than the drum maximum printable number of sheets (No in S25), the controller 100 determines that the drum cartridge 8 is reached its lifetime and displays, on the display 26, a lifetime end error message concerning the drum cartridge 8 (S27).

When determining in step S25 that the drum cumulative number of printed sheets is smaller than the drum maximum printable number of sheets (Yes in S25), the controller 100 determines whether the cumulative drum rotation number is smaller than the maximum drum rotation number (S26). When determining in step S26 that the cumulative drum rotation number is not smaller than the maximum drum rotation number (No in S26), the controller 100 determines that the drum cartridge 8 is reached its lifetime and displays, on the display 26, a lifetime end error message concerning the drum cartridge 8 (S27).

When determining in step S26 that the cumulative drum rotation number is smaller than the maximum drum rotation number (Yes in S26), the controller 100 determines that the drum cartridge 8 is not reached its lifetime.

Figure 9:
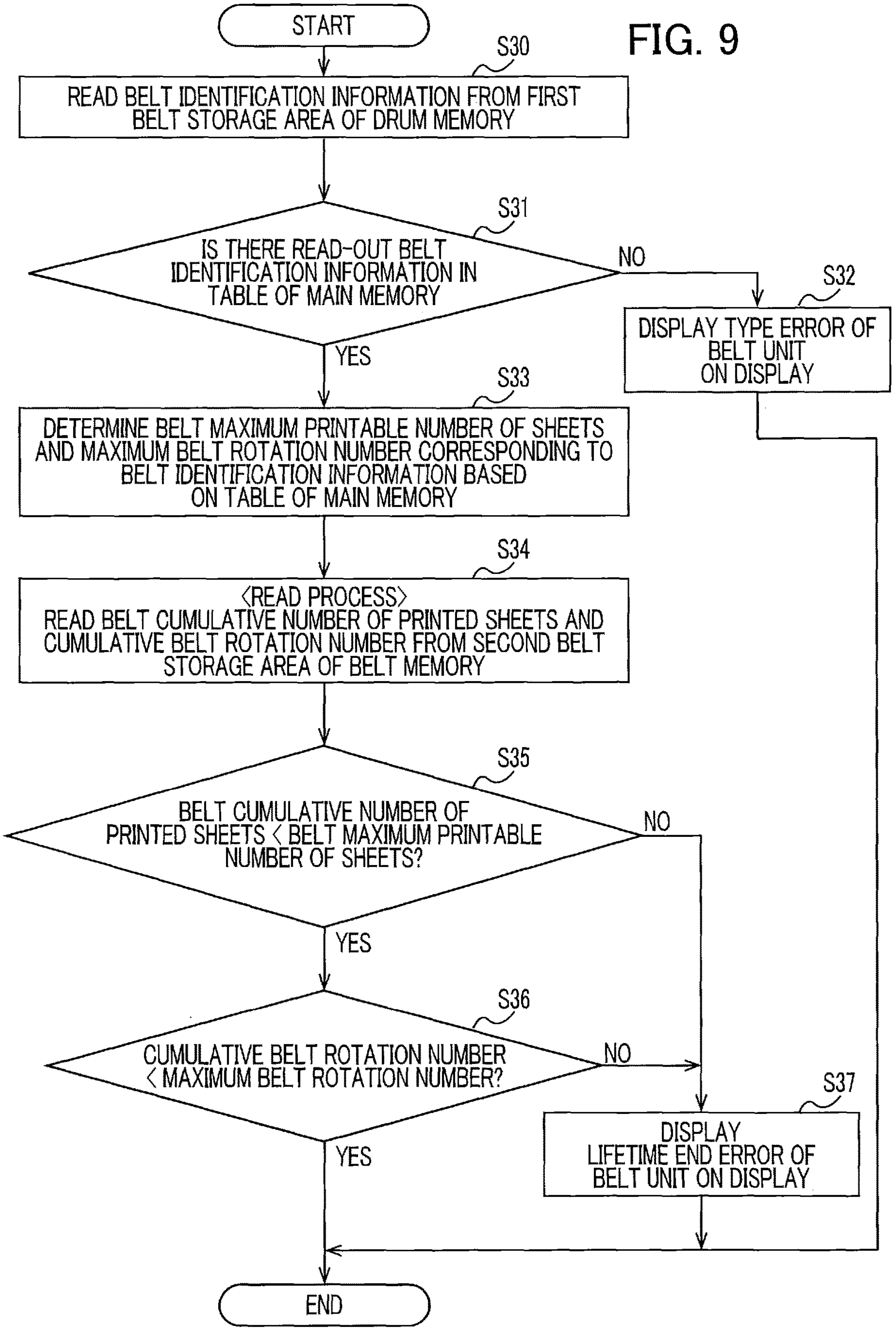
FIG. 9 is a flowchart illustrating a lifetime check process of the belt unit.

The following describes an example of lifetime check process for the belt unit 6 executed by the controller 100 with reference to a flowchart illustrated in FIG. 9. The lifetime check process is repeatedly performed until the image forming apparatus 1 is turned off after the belt unit 6 is turned on.

As illustrated in FIG. 9, the controller 100 reads the belt identification information from the first belt storage area of the belt memory 65 (S30).

After step S30, the controller 100 determines whether there is the read belt identification information in the table (see FIG. 5) of the main memory 110 (S31).

When determining in step S31 that the read belt identification information is not present in the table of the main memory 110 (No in S31), the controller 100 determines that the belt unit 6 does not adapt to the image forming apparatus 1, displays the type error of the belt unit 6 on the display 26 (S22), and ends this routine.

On the other hand, when determining in step S31 that the read belt identification information is present in the table of the main memory 110 (Yes in S31), the controller 100 determines the belt maximum printable number of sheets and maximum belt rotation number corresponding to the belt identification information based on the table of the main memory 110 (S33).

After step S33, as the read process, the controller 100 reads the belt cumulative number of printed sheets and cumulative belt rotation number from the second belt storage area of the belt memory 65 (S34).

After step S34, the controller 100 determines whether the belt cumulative number of printed sheets is smaller than the belt maximum printable number of sheets (S35). When determining in step S35 that the belt cumulative number of printed sheets is not smaller than the belt maximum printable number of sheets (No in S35), the controller 100 determines that the belt unit 6 is reached its lifetime and displays, on the display 26, a lifetime end error message concerning the belt unit 6 (S37).

When determining in step S35 that the belt cumulative number of printed sheets is smaller than the belt maximum printable number of sheets (Yes in S35), the controller 100 determines whether the cumulative belt rotation number is smaller than the maximum belt rotation number (S36). When determining in step S36 that the cumulative belt rotation number is not smaller than the maximum belt rotation number (No in S36), the controller 100 determines that the belt unit 6 is reached its lifetime and displays, on the display 26, a lifetime end error message concerning the belt unit 6 (S37).

When determining in step S36 that the cumulative belt rotation number is smaller than the maximum belt rotation number (Yes in S36), the controller 100 determines that the belt unit 6 is not reached its lifetime.

As described above, the image forming apparatus 1 and developing cartridge 9 according to the present embodiment provide the following advantageous effects.

With the image forming apparatus 1, whether the developing cartridge 9 is reached its lifetime can be determined by using at least one of the developing maximum printable number of sheets corresponding to developing identification information read from among a plurality of pieces of developing identification information, maximum developing roller rotation number corresponding to developing identification information read from among a plurality of pieces of developing identification information, and maximum dot count corresponding to developing identification information read from among a plurality of pieces of developing identification information, and at least one of the developing cumulative number of printed sheets, cumulative developing roller rotation number, and cumulative dot count. This allows proper lifetime management to be performed for the developing cartridges 9 of a plurality of types.

Further, by determining whether the developing cartridge 9 is reached its lifetime by using the developing cumulative number of printed sheets, cumulative developing roller rotation number, and cumulative dot count, the lifetime management can be performed more reliably.

Further, whether the drum cartridge 8 is reached its lifetime can be determined by using at least one of the drum maximum printable number of sheets corresponding to drum identification information read from among a plurality of pieces of drum identification information and maximum drum rotation number corresponding to drum identification information read from among a plurality of pieces of drum identification information, and at least one of the drum cumulative number of printed sheets and cumulative drum rotation number. This allows proper lifetime management to be performed for the drum cartridges 8 of a plurality of types.

Further, by determining whether the drum cartridge 8 is reached its lifetime by using the drum cumulative number of printed sheets and cumulative drum rotation number, the lifetime management can be performed more reliably.

Further, whether the belt unit 6 is reached its lifetime can be determined using at least one of the belt maximum printable number of sheets corresponding to belt identification information read from among a plurality of pieces of belt identification information and maximum belt rotation number corresponding to belt identification information read from among a plurality of pieces of belt identification information, and at least one of the belt cumulative number of printed sheets and cumulative belt rotation number. This allows proper lifetime management to be performed for the belt unit 6 of a plurality of types.

Further, by determining whether the belt unit 6 is reached its lifetime using the belt cumulative number of printed sheets and cumulative belt rotation number, the lifetime management can be performed more reliably.

The present disclosure is not limited to the above embodiment and may be modified in various forms as follows.

In the above embodiment, the identification information for identifying the type of a consumable item is assigned according to manufacturer, volume, rank, and other categories; however, the type and the number of the categories according to which the identification information is assigned are not particularly limited and may be appropriately determined depending on the consumable item.

In the above embodiment, the developing cartridge can be detachably attached to the main body in a state of being attached to the drum cartridge; however, the developing cartridge may be attached to the main body. In this case, the developing cartridge and drum cartridge are individually detached and attached with respect to the main body.

In the above embodiment, the developing memory, drum memory, and belt memory each have the first and second storage areas; however, each memory may have only the first storage area. In this case, in addition to the identification information, information such as the cumulative number of printed sheets may be stored in the first storage area.

In the above embodiment, a monochrome laser printer is exemplified as the image forming apparatus; however, the image forming apparatus may be a color laser printer, a copying machine, or a multifunction machine.

In the above embodiment, the error message is displayed on the display 26; however, the error message may be displayed elsewhere such as a personal computer connected to the image forming apparatus, or may be notified to a user in other ways such as voice.

The constituent elements described in the embodiment and modifications may be combined as desired.

What is claimed is:

1. A developing cartridge comprising:

a developing roller; and a developing memory having:

a developing storage area storing therein a developing identification information which identifies a specific type of the developing cartridge, the developing storage area being configured to store therein a developing roller rotation number corresponding to a number of times the developing roller rotates when printing is performed, and a dot count corresponding to a number of dots printed, wherein whether the developing cartridge is reached a lifetime is determinable, at least in part, on a basis of:

the developing roller rotation number and a maximum developing roller rotation number which corresponds to the developing identification information; and the dot count and a maximum dot count which corresponds to the developing identification information.

2. The developing cartridge according to claim 1, wherein the developing storage area is configured to store therein a developing number of printed sheets corresponding to a number of printed sheets.

3. The developing cartridge according to claim 2, wherein whether the developing cartridge is reached the lifetime is determinable, at least in part, on a basis of:

the developing number of printed sheets and a developing maximum printable number of sheets which corresponds to the developing identification information.

4. The developing cartridge according to claim 1, wherein the developing identification information identifies the specific type of the developing cartridge from among a plurality of types of the developing cartridge.

5. The developing cartridge according to claim 1, wherein the developing identification information indicates a volume of the developing cartridge.

6. The developing cartridge according to claim 1, wherein the developing storage area has:

a first area storing the developing identification information, a second area configured to store therein the developing roller rotation number, and a third area configured to store therein the dot count.

7. A developing cartridge comprising:

a developing roller; and a developing memory having:

a developing storage area storing therein a developing identification information which identifies a specific type of the developing cartridge, the developing storage area configured to store therein a developing roller rotation number corresponding to a number of times the developing roller rotates when printing is performed, and a dot count corresponding to a number of dots printed, wherein whether the developing cartridge is reached a lifetime is determinable, at least in part, on a basis of:

the developing roller rotation number and a maximum developing roller rotation number identified by the developing identification information; and the dot count and a maximum dot count identified by the developing identification information.

8. The developing cartridge according to claim 7, wherein the developing storage area is configured to store therein a developing number of printed sheets corresponding to a number of printed sheets.

9. The developing cartridge according to claim 8, wherein whether the developing cartridge is reached the lifetime is determinable, at least in part, on a basis of:

the developing number of printed sheets and a developing maximum printable number of sheets identified by the developing identification information.

10. The developing cartridge according to claim 7, wherein the developing identification information identifies the specific type of the developing cartridge from among a plurality of types of the developing cartridge.

11. The developing cartridge according to claim 7, wherein the developing identification information indicates a volume of the developing cartridge.

12. The developing cartridge according to claim 7, wherein the developing storage area has:

a first area storing the developing identification information, a second area configured to store therein the developing roller rotation number, and a third area configured to store therein the dot count.

* * * * *